(No Model.)
2 Sheets—Sheet 1.

F. S. FARR.
LUMBER SORTER.

No. 472,016. Patented Mar. 29, 1892.

Witnesses
A. H. Opdahl.
Frank D. Merchant.

Inventor
Freeman S. Farr
By his Attorney
Jas. P. Williamson (No Model.)  2 Sheets—Sheet 2.

F. S. FARR.
LUMBER SORTER.

No. 472,016.  Patented Mar. 29, 1892.

Witnesses
A. H. Opsahl.
Frank D. Merchant.

Inventor.
Freeman S. Farr
By his Attorney.
Jas. F. Williamson

UNITED STATES PATENT OFFICE.

FREEMAN S. FARR, OF MINNEAPOLIS, MINNESOTA, ASSIGNOR OF ONE-HALF TO RAY W. JONES, OF SAME PLACE.

LUMBER-SORTER.

SPECIFICATION forming part of Letters Patent No. 472,016, dated March 29, 1892.

Application filed July 6, 1891. Serial No. 398,486. (No model.)

*To all whom it may concern:*

Be it known that I, FREEMAN S. FARR, a citizen of the United States, residing at Minneapolis, in the county of Hennepin and State of Minnesota, have invented certain new and useful Improvements in Lumber-Sorters; and I do hereby declare the following to be a full, clear, and exact description of the invention, such as will enable others skilled in the art to which it appertains to make and use the same.

My invention relates to lumber-sorters, and has for its object to provide an efficient device for separating lumber according to its length. To this end I arrange a series of movable carriers in such manner that they break joints and are offset from each other in regular order to form a series of drops corresponding to the different lengths of lumber, increasing in the direction of the feed. The carriers consist of parallel sets of two carriers each spaced apart to different distances to form the drops at their delivery ends. The carriers are preferably endless sprocket-chains supported and driven by corresponding sets of sprocket-wheels and shafts in a continuous direction from a common source. The carriers are mounted on a truss-work or other suitable supports at such elevation as to give a space for the lumber to drop from the carriers.

The invention is illustrated in the accompanying drawings, wherein like letters refer to like parts throughout.

Figure 1:
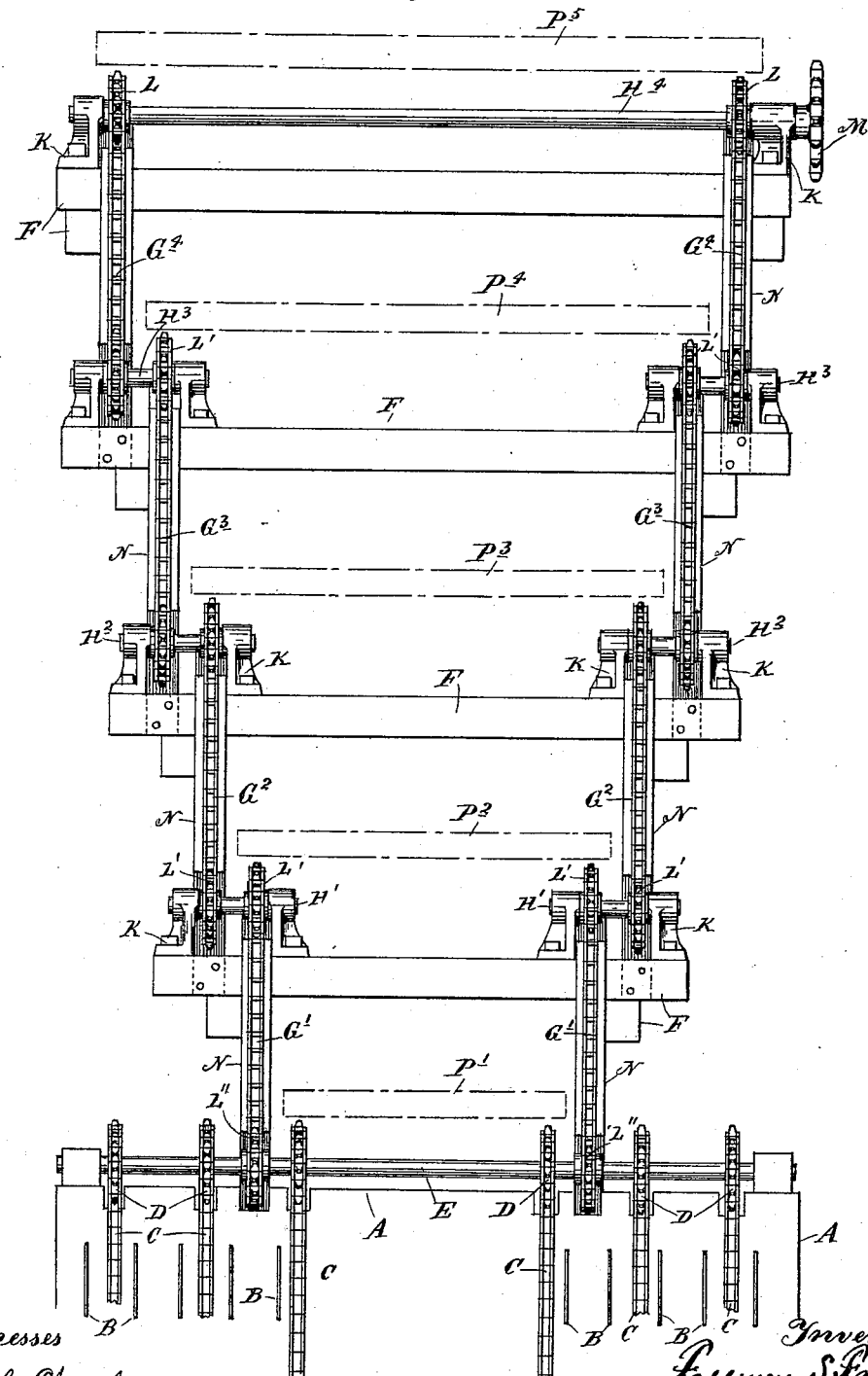
Figure 2:
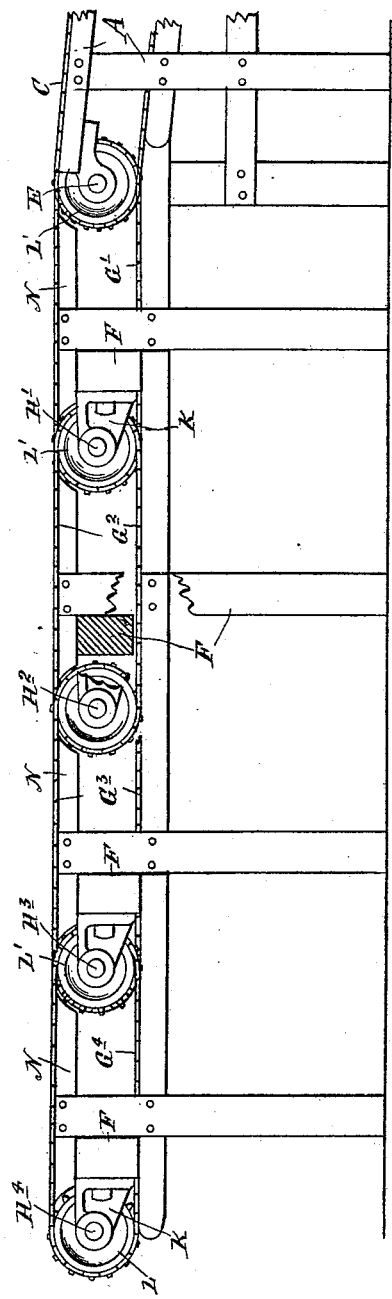

Figure 1 is a plan view of the device in working position, and Fig. 2 is a left side elevation of the same.

A is the frame-work; B, the saws; C, the feed-chains; D, the sprocket-wheels, and E the sprocket-wheel shaft constituting the trimmer for cutting the lumber to different uniform lengths, such as is in general use in sawmills.

F is the truss-work.

$G'$ $G'$ are the head set of carriers, and $G^2$ $G^2$, &c., are the succeeding sets of the series.

$H'$ $H'$ $H^2$ $H^2$, &c., are the corresponding sets of sprocket-wheel shafts mounted in brackets K, secured to the truss-work. L L' are the sprocket-wheels on these shafts for supporting and driving the sprocket-chain carriers. Each of the said shafts, except the outermost, is provided with a pair of sprocket-wheels. For supporting the receiving ends of the head set of carriers sprocket-wheels L'' are mounted loosely on the sprocket-wheel shaft E of the trimmer. Of these sprocket-wheel shafts $H'$ $H^2$, &c., all except the outermost may be divided or consist of separate short shafts for each pair of sprocket-wheels; but the outermost shaft $H^4$ is continuous and is provided on one end with a driving-wheel M, preferably a sprocket-wheel, driven by a sprocket-chain (not shown) from any source of power.

N are runways for the endless carriers to prevent the same from sagging with their loads.

$P'$, $P^2$, $P^3$, $P^4$, and $P^5$ represent the different lengths of lumber as they pass to the drop from the delivery ends of the carriers.

It will be seen that the different sets of carriers break joints with each other and are offset or spaced apart to different distances, so as to form drops for the different lengths of lumber.

The operation is evident. Power being applied to the sprocket-wheel M, the endless carriers will all be driven from the shaft $H^4$ in a continuous direction. As the lumber comes from the trimmer the shortest lengths will be dropped from the end of the trimmer feed-chain C. All the other lengths will be received and carried forward by the head set of carriers, the next shorter length of lumber being dropped from the delivery end of the same, as shown at $P^2$. The third size will be dropped from the delivery ends of the second set of carriers, the fourth from the third set of carriers, and the fifth from the fourth set of the series. If the lumber is cut on the trimmer into a greater number of lengths, it is only necessary to add additional sets of carriers properly spaced apart to effect the corresponding number of drops.

What I claim, and desire to secure by Letters Patent of the United States, is as follows:

1. An automatic lumber-sorter comprising a series of movable endless carriers offset from each other in regular order to form a series of drops increasing in lengthwise clearance in regular order from the feeding end, each succeeding carrier being arranged to receive the undropped lumber from the delivery end of the preceding carrier, substantially as described.

2. An automatic lumber-sorter comprising sets of movable parallel endless carriers arranged in a successive series, breaking joints with each other, and spaced apart to different distances to form a series of drops at their delivery ends, increasing in regular order in the direction of the feed.

3. An automatic lumber-sorter comprising successive sets of movable parallel endless carriers breaking joints with each other and spaced apart to different distances to form a successive series of drops at their delivery ends, increasing in the direction of the feed, and means for driving all of said carriers in a continuous direction from a common shaft.

4. The combination, with the successive sets of movable endless carriers, breaking joints with each other and spaced apart at different distances to form successive sets of drops at their delivery ends, increasing in the direction of the feed, of corresponding sets of sprocket-wheels, the sprocket-wheels of adjoining chains being mounted on common shafts, constituting, together with said chains, a continuous train of gear movable from a single source.

In testimony whereof I affix my signature in presence of two witnesses.

FREEMAN S. FARR.

Witnesses:
    JAS. F. WILLIAMSON,
    EMMA F. ELMORE.